US009860586B2

(12) United States Patent
Derrenberger et al.

(10) Patent No.: US 9,860,586 B2
(45) Date of Patent: Jan. 2, 2018

(54) CUSTOMER ASSOCIATED PROFILE FOR ACCESSING AUDIO AND VIDEO MEDIA OBJECTS

(71) Applicant: THOMSON LICENSING, Issy de Moulineaux (FR)

(72) Inventors: Mike Arthur Derrenberger, Hopkinton, MA (US); Terry Wayne Lockridge, Dayton, OH (US); Robert Eugene Trzybinski, Granger, IN (US); Keith Reynolds Wehmeyer, Fishers, IN (US)

(73) Assignee: THOMSON Licensing, Issy-les-Moulineaux (FR)

( * ) Notice: Subject to any disclaimer, the term of this patent is extended or adjusted under 35 U.S.C. 154(b) by 0 days.

(21) Appl. No.: 14/313,825

(22) Filed: Jun. 24, 2014

(65) Prior Publication Data
US 2014/0310738 A1   Oct. 16, 2014

Related U.S. Application Data

(63) Continuation of application No. 11/047,180, filed on Jan. 31, 2005, now abandoned.

(51) Int. Cl.
H04N 5/445      (2011.01)
H04N 21/433     (2011.01)
H04N 7/16       (2011.01)
H04N 21/214     (2011.01)
H04N 21/2343    (2011.01)
H04N 21/2389    (2011.01)
(Continued)

(52) U.S. Cl.
CPC ......... *H04N 21/4334* (2013.01); *H04N 7/165* (2013.01); *H04N 21/2143* (2013.01); *H04N 21/2389* (2013.01); *H04N 21/234309* (2013.01); *H04N 21/25833* (2013.01); *H04N 21/2665* (2013.01); *H04N 21/4385* (2013.01); *H04N 21/443* (2013.01); *H04N 21/44213* (2013.01); *H04N 21/440227* (2013.01); *H04N 21/4622* (2013.01); *H04N 21/4627* (2013.01); *H04N 21/4782* (2013.01); *H04N 21/6125* (2013.01); *H04N 21/6175* (2013.01); *H04N 21/6405* (2013.01); *H04N 21/64322* (2013.01)

(58) Field of Classification Search
CPC ........... H04N 21/4334; H04N 21/4622; H04N 21/4627
See application file for complete search history.

(56) References Cited

U.S. PATENT DOCUMENTS 5,481,609 A   1/1996 Cohen et al.
5,659,615 A   8/1997 Dillon
(Continued)

FOREIGN PATENT DOCUMENTS

WO   2004100539   11/2004

OTHER PUBLICATIONS

ISR for PCT/US2006/002758 dated Jul. 5, 2006.

*Primary Examiner* — Gigi L Dubasky
(74) *Attorney, Agent, or Firm* — Brian J. Dorini; Lily Neff

(57) ABSTRACT

A method is disclosed for transferring a received media object to remote devices in accordance to attributes in a user profile. The profile information additionally determinates the versions of the media object that are available to such remote devices and whether the media object may be stored in such remote devices.

12 Claims, 2 Drawing Sheets

(51) Int. Cl.
*H04N 21/258* (2011.01)
*H04N 21/2665* (2011.01)
*H04N 21/4385* (2011.01)
*H04N 21/4402* (2011.01)
*H04N 21/442* (2011.01)
*H04N 21/443* (2011.01)
*H04N 21/4782* (2011.01)
*H04N 21/61* (2011.01)
*H04N 21/6405* (2011.01)
*H04N 21/643* (2011.01)
*H04N 21/462* (2011.01)
*H04N 21/4627* (2011.01)

(56) References Cited

U.S. PATENT DOCUMENTS

| | | |
|---|---|---|
| 2002/0061029 A1 | 5/2002 | Dillon |
| 2002/0124270 A1* | 9/2002 | Mori ............... H04H 20/91 |
| | | 725/151 |
| 2003/0140345 A1 | 7/2003 | Fisk |
| 2004/0213053 A1* | 10/2004 | Kato et al. ............... 365/200 |
| 2005/0028208 A1 | 2/2005 | Ellis et al. |
| 2005/0091685 A1 | 4/2005 | Sezan et al. |
| 2005/0120373 A1* | 6/2005 | Thomas ........... H04N 21/47214 |
| | | 725/58 |
| 2006/0015580 A1 | 1/2006 | Gabriel et al. |
| 2006/0263040 A1 | 11/2006 | Mears et al. |
| 2009/0150959 A1 | 6/2009 | Jerding et al. |

* cited by examiner

CUSTOMER ASSOCIATED PROFILE FOR ACCESSING AUDIO AND VIDEO MEDIA OBJECTS

This application is a continuation of U.S. patent application Ser. No. 11/047,180, filed on Jan. 31, 2005, herein incorporated by reference.

FIELD OF THE INVENTION

The invention concerns the field of media object delivery, specifically the delivery of media objects to multiple locations based on a user profile.

BACKGROUND OF THE INVENTION

When a customer subscribes to a variety of media services such as cable television, satellite television, music providers, and the like, the customer typically accesses such services at a home location. When the customer travels to a new location for a temporary basis, such as a business trip or a vacation the customer is restricted from or has difficulty accessing these services.

One reason why a customer has difficulty accessing services they subscribe to that most locations offer media service providers that are restrictive or proprietary. For example, if a customer subscribes to a cable system with a specific package of services, it is highly unlikely that the customer would be able to use these services if a hotel the customer was staying at only offered satellite television.

SUMMARY OF THE INVENTION

A method is disclosed for transferring a received media object to remote devices in accordance to attributes in a user profile. The profile information additionally determinates the versions of the media object that are available to such remote devices and whether the media object may be stored in such remote devices.

DETAILED DESCRIPTION OF THE EMBODIMENTS

Figure 1:
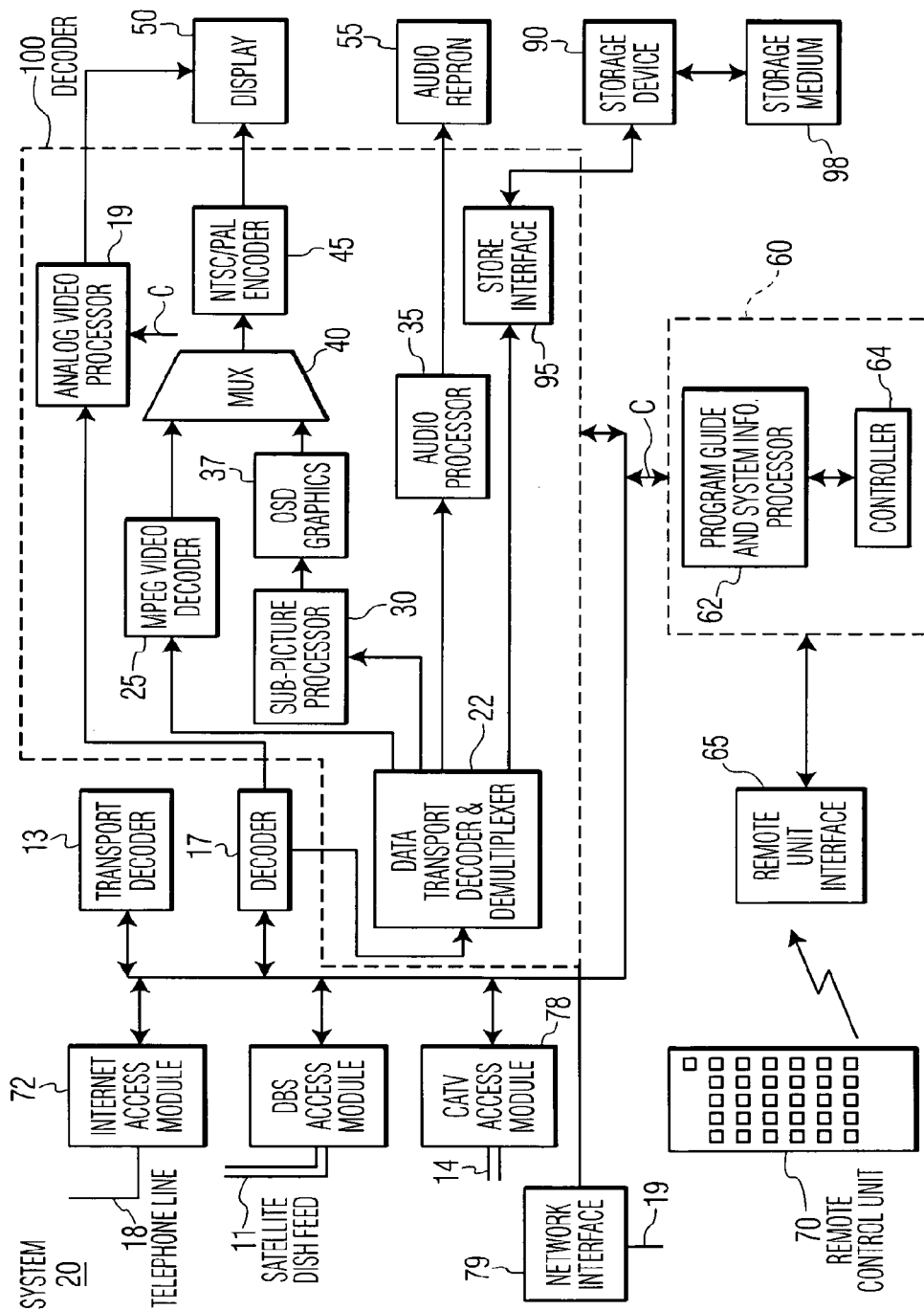
FIG. 1 shows an exemplary embodiment of a set top box according to an embodiment of the present invention.

The exemplary embodiments of the invention are described in view of a set top box capable of receiving and delivering media objects over an Internet Protocol based delivery system. Internet Protocol referring to a delivery system that receives media objects from a source such as a web site, media server, or other type resource available through an Internet connection. Typically, an IP enabled set top box is connected to the Internet through an connection such as a Digital Subscriber Line, a cable based connection, wireless connection, or other type of broadband connection. As used herein, the term "media object" includes audio, video, textual, multimedia data files, and streaming media files. Multimedia objects comprise any combination of text, image, video, and audio data. Streaming media comprises audio, video, multimedia, textual, and interactive data files that are delivered to a user via the Internet, satellite or other communications network environment and begin to play on the user's computer/device before delivery of the entire file is completed. Media objects may be transmitted over any communications network including via the Internet, satellite (digital satellite system, digital video system-satellite), cable, digital subscriber line, T1 lines, wireless network, or other delivery systems capable of delivering media objects.

Examples of the content of media objects include songs, political speeches, news broadcasts, movie trailers, movies, television show broadcasts, radio broadcasts, financial conference calls, live concerts, web-cam footage, and other special events. Media objects are encoded in various formats including REALAUDIO®, REALVIDEO®, REALMEDIA®, APPLE QUICKTIME®, MICROSOFT WINDOWS® MEDIA FORMAT, QUICKTIME®, MPEG-2 (MOTION PICTURE EXPERTS GROUP) VIDEO COMPRESSION, MPEG-4 VIDEO AND/OR AUDIO COMPRESSION, JOINT VIDEO TEAM COMPRESSION FORMAT (MPEG-4 part 10 AVC, H.264), MPEG-2 LAYER III AUDIO, MP3®. Typically, media objects are designated with extensions (suffixes) indicating compatibility with specific formats. For example, media objects (e.g., audio and video files) ending in one of the extensions, .ram, .rm, .rpm, are compatible with the REALMEDIA® format. Some examples of file extensions and their compatible formats are listed in the Table 1. A more exhaustive list of media types, media object at a specified IP address. A client, such as an IP enabled set top box, accesses a desired media object from the host at the specified IP address. The host maintains the multicasting operations by using a data protocol such as Internet Group Management Protocol (IGMP, see RFC 988 Appendix I). The host may also act as a gateway device that acts as a head end device that communicates and negotiates resources from the Internet to the client. For example, the client uses a DSL or cable connection to communicate with a headend or Digital Subscriber Line Access Multiplier (DSLAM) as a host to transmit and receive resources from the Internet. It does not matter for the operation of this invention if multicasting devices are level 1 or level 2, as according to RFC 988.

The availability of a media object as being available at an IP address may either use a permanently assigned IP address or a temporary IP address. A program called a multicast agent is responsible for keeping track of the members who join and leave a multicast group to receive a media object. The multicast agent may be in the same equipment that is used by a host, a router or any other networking capable equipment capable of maintenance of IGMP based multicasting connections.

FIG. 1 is an exemplary embodiment of a set top box capable of receiving a transmitting IP based media objects from a network, such as the Internet. Specifically, system 20 receives data from a network connection 19 that receives IP based data through may be any type of network connection such as an Ethernet connection, IEEE-1394, USB, fiber optic, twisted wire, and the like. Network interface 79 coupled to network connection 19 receives a requested media object is received through network connection 19 through an Internet or network based connection using an IP based transport scheme such as TCP/IP, see Transmission Protocol Control, Request For Comments 793, Network Working Group, September 1981. The data representing the media object is processed by transport decoder 13 that handles the TCP/IP based communications between system 20 and resources available through the network connection. Transport decoder 13 outputs the received program representative multiplexed audio, video and data components to unit 17 that demultiplexed the received into audio, video and data components by unit 22 that are further processed by the other elements of decoder system 100. These other elements include video decoder 25, audio processor 35, sub-picture processor extensions and compatible formats may be found at http://www.bowers.cc/extensions2.htm.

TABLE 1

| Format | Extension |
|---|---|
| REALMEDIA ® | .ram, .rm, .rpm |
| APPLE QUICKTIME ® | .mov, .qif |
| MICROSOFT WINDOWS ® MEDIA PLAYER | .wma, .cmr, .avi |
| MACROMEDIA FLASH | .swf, .swl |
| MPEG | .mpg, .mpa, .mp1, .mp2 |
| MPEG-2 LAYER III Audio | .mp3, .m3a, .m3u |

The illustrated embodiments of the invention operate with media objects that contain video data for presenting a video presentation of "near to motion picture quality". Such media objects may be encoded in a variety of formats such as MPEG-2 (Motion Picture Standards Group Standard ISO/IEC 13818-1:2000) and ITU-T H.264/MPEG AVC (ISO/IEC 14496-10), or may be uncompressed video.

In order to receive media objects, the IP enabled set top box joins or leaves an IP address called a multicasting group which has a corresponding media object transmitted on such an IP address. Multicasting groups also allow multiple set top boxes (multiple subscribers) to join the same IP address to receive a media object. In contrast, a non-multicasting group only allows for one set top box (as a single subscriber) to use an IP address at a time.

The multicasting operations described for the invention make use of a multicasting proxy compatible with the protocol described in the document entitled Host Extensions For IP Multicasting (Request For Comments (RFC) 988, Network Working Group, July 1986), although other multicasting protocols may be used in accordance with the principles of the present invention. For purposes of this invention, a host will be the party that is responsible for distributing a 30, on-screen graphics display generator (OSD) 37, multiplexer 40, NTSC encoder 45 and storage interface 95. In one mode, decoder 100 provides decoded data of media object for display and audio reproduction on units 50 and 55 respectively. In another mode, the transport stream from unit 17 is processed by decoder 100 to provide a datastream representative of media object for storage on storage medium 98 via storage device 90.

In other input data modes, units 72, 74, and 78 provide interlaces additional interfaces for Internet streamed video and audio data from telephone line 18, satellite data from feed line 11 and cable video from cable line 14, and video and guide data from network connection 19, respectively. The processed data from units 72, 74, and 78 is appropriately decoded by units 13 and 17 and is provided to decoder 100 for further processing in similar fashion to that described in connection with network interface 79.

A user selects for viewing either a media object or an on-screen menu, such as a program guide, by using a remote control unit 70. Processor 60 uses the selection information provided from remote control unit 70 via interface 65 to appropriately configure the elements of FIG. 1 to receive a desired program channel for viewing. Processor 60 comprises processor 62 and Controller 64. Unit 62 processes (i.e. parses, collates and assembles) program specific information including program guide and system information and controller 64 performs the remaining control functions required in operating decoder 100. Although the functions of unit 60 may be implemented as separate elements 62 and 64 as depicted in FIG. 1, they may alternatively be implemented within a single processor. For example, the functions of units 62 and 64 may be incorporated within the programmed instructions of a microprocessor. Processor 60 configures processor 13, decoder 17 and decoder system 100 to demodulate and decode the input signal format and coding type. Units 13, 17 and sub-units within decoder 100 are individually configured for the input signal type by processor 60 setting control register values within these elements using a bi-directional data and control signal bus C.

The transport stream information provided to decoder 100 comprises data packets containing program channel data and program specific information. Unit 22 directs the program specific information packets to processor 60 that parses, collates and assembles this information into hierarchically arranged tables. Individual data packets comprising the User selected program channel are identified and assembled using the assembled program specific information. The program specific information contains conditional access, network information and identification and linking data enabling the system of FIG. 1 to request a media object from a listed multicasting group at a IP multicast address and assemble data packets to form complete programs. The program specific information also contains ancillary program guide information (e.g. an Electronic Program Guide—EPG) and descriptive text related to media objects as well as data supporting the identification and assembly of this ancillary information.

In creating a listing of available media objects that are obtained through a multicast enabled media object, a service identifier such as an identifier compliant with a Session Description Protocol (SDP, see Request For Comments 2327, Network Working Group, April 1998) is used to identify attributes of a media object. The identifier contains attribute information such as the title of the media object, the multicast address or information that is used to identifier where the service may be obtained, the time the media object is available, the duration of the service, the transport protocol of the media object, and format of the media object, any metadata related to the title, author, and content of said media object, and the like. The service identifiers are made available directly to routers, hosts, clients, and other network enabled components that operate in view of multicasting services. These service identifiers may also be identified as "channels" which are mapped to multicast addressed as broadcast channels are mapped to specified broadcast frequencies. Preferably, the multicast address and port of a multicast media object is mapped to a "channel" in a channel file, see Table 2. This channel mapping information) is kept internally in a set top box in the case of the set top box operating as a thick client, and is kept externally in a middleware server or other type of database in the case where the set top box operates as a thin client

TABLE 2

| IP ADDRESS | PORT | CHANNEL |
|---|---|---|
| 129.111.111.234 | 10 | 2 |
| 48.231.114.123 | 10 | 3 |
| 101.111.145.55 | 20 | 5 |
| 77.123.204.164 | 25 | 105 |

In one embodiment of the present invention, a headend device such as a router or server operates as a network gateway device that enables a set top box as system 20 to communicate to the Internet. Service identifiers, when available, are broadcast through multicasting agents to the headend device that in turn communicate these identifiers to set top box 20. These service identifiers may then be collated by set top box 20 to form a program guide that a user selects a media object from. This information would be an addition to the IGMP based information that is typically communicated between a gateway device and a client such as set top box 20. In addition, service identifier information may be available from a server or router on the Internet that acts primarily for the purpose of listing multicast programming. Alternatively, service identifiers are transmitted as part of the auxiliary information that accompanies the audio and video data of a selected media object directly to set top box 20, without reliance on an Internet gateway device. Other mechanisms may be used to obtain service identifier information, in accordance with the principles of the present invention.

Set top box 20 is also enabled to operate with software that operates a program as an Internet browser such as Microsoft Internet Explorer 6.0 or MOZILLA to render data received from the Internet. Specifically, the browser software is used to operate with programs languages such as JavaScript or ActiveX Scripts. Preferably, middleware software is installed on set top box 20 to render and enable web pages, programs, and other Internet based programming that are rendered for display by NTSC/PAL encoder 45 and operated via a user control device such as remote control unit 70. The middleware software may optionally control the operation of set top box 20 to join/leave multicast services, render an electronic program guide using received program indicators, and negotiate IGMP information to and from a internet access gateway such as a router or server, as described above.

Figure 2:
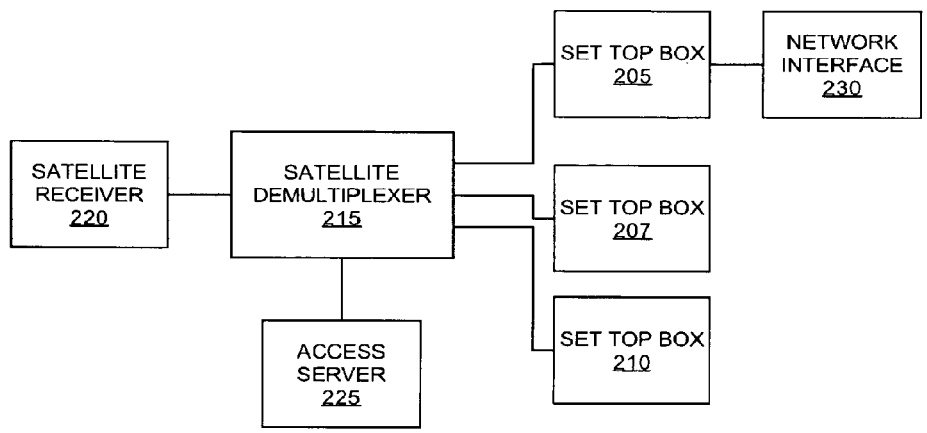
FIG. 2 shows an exemplary embodiment of a system of set top boxes that received media objects from a satellite source according to an embodiment of the present invention.

FIG. 2 is a block diagram of a system 200 illustrating an embodiment of the present invention for use with multiple set top boxes that receive satellite programming. Satellite receiver 220 represents an apparatus that is capable of receiving a satellite signal containing a multiplexed video and audio signal from an entertainment provider as DIRECTV. Satellite demultiplexer 215 receives the multiplexed video and audio signal and demultiplexes the signal into corresponding video and audio objects that are capable of being delivered to set top boxes 205, 207, and 210. Optionally, satellite demultiplexer 215 receives both high and low definition versions of media objects and related programming. For example, channel 2 may be a premium subscription channel such as HBO or CINEMAX where a high definition and a low definition of the channel are available.

For purposes of the present invention, the respective media objects are made available as resources that are addressable as "channels" as described in Table 2, where such channels are resolved at specified IP and port addresses. It is noted that the delivery of such media objects is not limited to this embodiment and may include any of the video or audio input sources described in connection with FIG. 1.

The operation of set top boxes 205, 207, and 210 operate in a fungible manner, where the operation of satellite multiplexer 215 makes video and audio media objects available to a particular set top box based on a user profile. The user profile reflects a selection of video and audio objects that a user subscribes to. Table 3 presents an illustration of several user profiles and permissions for channels.

TABLE 3

| USER ID | CHANNEL | AVAILABLE | TRANSFERABLE | RECORDABLE | AVAILABLE FORMAT | DEVICE ID |
|---|---|---|---|---|---|---|
| User 1 | 2 | Y | Y | Y | HIGH, LOW | 205 |
| User 1 | 3 | Y | N | Y | LOW | 205 |
| User 1 | 5 | N | N | N | NONE | 205 |
| User 1 | 105 | N | N | N | NONE | 205 |
| User 2 | 2 | Y | N | N | HIGH, LOW | 207 |
| User 2 | 3 | N | N | N | NONE | 207 |
| User 2 | 5 | Y | N | Y | LOW | 207 |
| User 2 | 105 | Y | ONLY LOW | ONLY LOW | HIGH, LOW | 207 |

The user ID column represents the user id of a particular user. This ID is used for associating what channels are available to a specific user and what the user may do with such channels. The channel column identifies a specific channel. The available column lists whether a particular channel is available to a user. The transferable column indicates whether a channel can be transferred between devices.

The recordable column indicates whether a channel can be recorded and whether a high definition or a low definition version of the channel is available. The available format column indicates if a high definition and/or a low definition version of a channel are available. The device ID column is the particular set top box that is associated with a user.

When using the information in TABLE 3, satellite demultiplexer 215 would make channels 2 and 3 available to user 1. Typically, satellite demultiplexer 215 would only allow such channels to be viewed at set top box 205, according to the information in the device ID column. The present invention however introduces as aspect where the viewing of channels are transferable to other devices. If satellite demultiplexer 215 determines that a particular user may transfer a channel, satellite demultiplexer 215 would then make such a channel available to other set top boxes.

In regards to user 2, channels 2, 5, and 105 are available with only channel 105 being capable of being transferred to other set top boxes. It is however noted that although channel 105 is recordable, only a low definition version of the channel can be recorded, even though a high and low definition of the channel 105 is available. In addition, for channel 105 only a low definition version of the channel is capable of being transferred.

For example for User 1, channel 2 is transferable and channel 3 is not. Hence, User 1 would be able to watch channel 2 on set top boxes 205, 207, and 210. In contrast, User 1 would only be able to watch channel 3 on set top box 205.

The user profile information is made available to satellite demultiplexer 215 through access server 225. Preferably, server 225 stores information in a database that associates user to their corresponding profile. The user profile may be received by access server 225 through several different means such as service information transmitted in the multiplexed signal received by satellite receiver 220, a network connection to the Internet to a headend device, and the like. Such access information is updated periodically or on demand.

Referring back to TABLE 3, such identification information may also be made available to system 200 by use of a smartcard entered into set top boxes 205, 207, 210, a password that authenticates a user, and the like.

It is contemplated that the principles of the present invention may also be linked to other types of identification information, such a frequent flyer card, hotel rewards program, and the like. System 200 may be implemented in a setting such as a hotel, so that when a user stays on site, the user's profile of channels available would also be linked to a hotel rewards program account. This association between a user's profile and a hotel rewards program would be available via access server 215. Hence, when a user checks into a hotel, the hotel operator would provide the user with the same type of channel lineup the user subscribes to. This profile would therefore follow the user to whatever hotel the user checks into in the hotel network. The portability of a user's profile also applies to other types of situations where a user accesses programming such as an airplane, bus, boat, and the like, using the principles addressed above.

Figure 3:
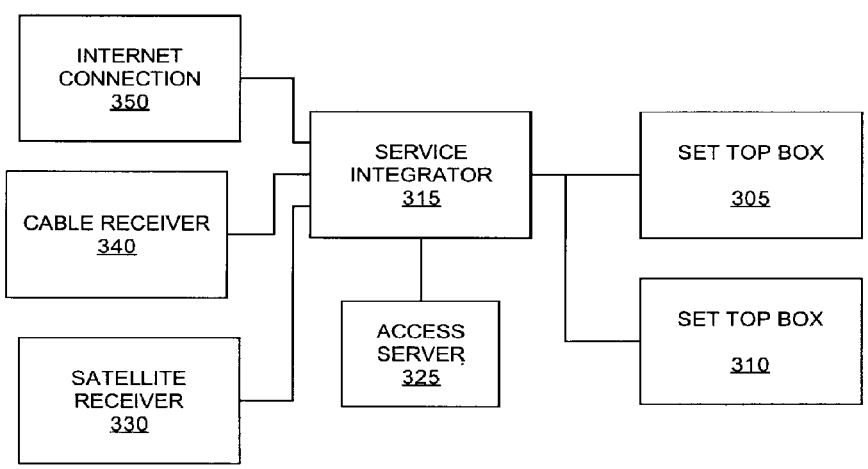
FIG. 3 shows an exemplary embodiment of a system for delivering media objects from several different sources to a set top box according to an embodiment of the present invention.

The principles of the present invention may be applied to any type of MSO where Internet, cable, satellite, broadcast, or any other delivery modality may be used to deliver a video and audio services, as shown in FIG. 3. In this embodiment, a user using set top box 305 may receive media objects from three sources; satellite receiver 330 that receives satellite television content, cable receiver 340 that receives cable based content, and internet connection 350 that receives media objects via the Internet. These sources are specific in that the home device of a user is set top box 305.

The various sources of media objects are processed by service integrator 315, which is conditioned to convert received programming from the format is received from into a format capable of being delivered to set top box 305. For example, satellite receiver 330 receives media objects in the form of programming delivered over channels in an MPEG-2 based transport stream. Service integrator 315 uses a transcoding program such as X to convert the MPEG-2 based transport stream into a TCP/IP stream capable of being received by set top box 305.

The transcoding operation performed by service integrator 315 is also performed for cable receiver 340 and Internet connection 350. In the case of Internet connection 350, service integrator 315 is conditioned to convert streaming media formats such as REAL MEDIA and WINDOWS MEDIA 9 into format that is capable of being rendered on set top box 305. For example, if set top box 305 typically uses an MPEG-2 decoder to show video, service integrator 315 would convert a received video object into an MPEG-2 stream. Other transcoding operations may be employed according to the principles of the present invention.

Access server 325 operates in a manner similar to access server 225 of FIG. 2, expect that access server 325 is expanded to consider the access permissions for satellite receiver 330, cable receiver 340, and Internet receiver 350. Preferably, access server 325 is capable of operating with several different security schemes such as operating with a smart card (as for a satellite receiver 330), a cable card (for cable receiver 340), and a password (for internet connection 350). Access server 325 operates with service integrator 315 to determine whether a received source may be rendered on set top box 305.

As in FIG. 2, it is contemplated that a user would have the capability of having several media services from different sources, rendered on a device that is not the home device of the user. In the present embodiment (of FIG. 3), set top box 310 represents a device that is not the home device of a user. The invention makes use of access permissions, as indicated in TABLE 4, when considering media objects from different sources.

In addition, a variety of delivery modalities may be combined where a user would be able to combine the delivery of cable and satellite services to a set top box. Such permissions of available audio and video services however would depend upon the user profile of a particular user, as shown in TABLE 4.

TABLE 4

| USER ID | MEDIA OBJECT | SOURCE | TRANSFERABLE | RECORDABLE | FORMAT | DEVICE ID |
|---|---|---|---|---|---|---|
| User 1 | CHANNEL 2 | CABLE | Y | Y | HIGH, LOW | 205 |
| User 1 | CHANNEL 3 | CABLE | N | Y | LOW | 205 |
| User 1 | HBO | SAT | N | N | LOW | 205 |
| User 1 | SHOWTIME | SAT | N | N | HIGH, LOW | 205 |
| User 1 | TOM SAWYER.MP3 | RHAPSODY | N | ONLY STEREO | 5.1, STEREO | 205 |
| User 1 | MOVIE1.WMV | MOVIELINK | Y | ONLY LOW | HIGH, LOW | 205 |
| User 1 | MOVIE2.MPG | TECHNICOLOR | N | Y | LOW | 205 |

The user id column of TABLE 4 identifies a particular user. The media object column represents either a channel, source, or media object file that a particular user may access. For example, channel 2 is a cable channel while MOVIE1.WMV is a movie encoded in a WINDOWS MEDIA 9 format.

The source column of TABLE 4 identifies the source of a media object. The different sources used as examples include Cable, Satellite, the RHAPSODY music service, the MOVIELINK movie service, and TECHNICOLOR movie on demand service. The transferable, recordable, and format columns correspond to similar information as present in TABLE 3.

The format information for the MP3 encoded file called Tom Sawyer introduces a new function where multiple versions of a sound file are available. In this particular example, both stereo and 5.1 DOLBY encoded versions of the song are available. As however noted in the recordable column, only the stereo version of such the music file may be recorded. Other examples of the information associated with a user profile as identified in TABLES 3 and 4 are to be utilized in accordance with the principles of the present invention.

The present invention may be embodied in the form of computer-implemented processes and apparatus for practicing those processes. The present invention may also be embodied in the form of computer program code embodied in tangible media, such as floppy diskettes, read only memories (ROMs), CD-ROMs, hard drives, high density disk, or any other computer-readable storage medium, wherein, when the computer program code is loaded into and executed by a computer, the computer becomes an apparatus for practicing the invention. The present invention may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose processor, the computer program code segments configure the processor to create specific logic circuits.

The invention claimed is:

1. A method to record a media comprising the steps of:
   determining a source of a media content being received by a device from a computer network based on at least one received service identifier that contains information identifying attributes of said media content;
   determining whether said media content is representative of a streamed channel or a media content file based on said at least one received service identifier;
   determining available resolution formats for said media content based on said at least one received service identifier; and
   permitting recording of an available resolution format for said media content on said device based on the source of said media content, said available resolution formats for said media content, and whether said media content is representative of a streamed channel or a media content file; wherein said recording is permitted for a first available resolution format and denied for a second available resolution format based on said streamed channel or media content file.

2. The method of claim 1, wherein the available resolution format for said media content includes at least one of 5.1 DOLBY and stereo.

3. An apparatus to record a media content comprising:
   a processor;
   a memory containing a set of instructions executed by the processor, the executed set of instructions cause the processor to perform the operations:
   determining a source of a media content being received by a device based on at least one received service identifier that contains information identifying attributes of said media content;
   determining whether said media content is representative of a streamed channel or a media content file based on said at least one received service identifier;
   determining available resolution formats for said media content based on said at least one received service identifier; and
   permitting recording of an available resolution format for said media content on said device based on the source of said media content, said available resolution formats for said media content, and whether said media content is representative of a streamed channel or a media content file; wherein said recording is permitted for a first available resolution format and denied for a second available resolution format based on said streamed channel or media content file.

4. The apparatus of claim 3, wherein the available resolution format for said media content includes at least one of high and low.

5. The apparatus of claim 3, wherein the available resolution format for said media content includes at least one of DOLBY and stereo.

6. The apparatus of claim 3, wherein said processor in determining source of a media content also determines if a channel of said media content is at least based on the at least one received service identifier.

7. A method to transfer receiving a media content comprising the steps of:
   determining a channel of a media content being received by a device from a computer network based on at least one received service identifier that contains information identifying attributes of said media content; and
   permitting transfer of said media content from said device to another device based on the channel of said media content; wherein permitting transfer of a first available resolution format for said media content from said device to another device is based on the channel of said media content; and wherein denying transfer of a second available resolution format for said media content from said device to another device is based on the channel of said media content.

8. The method of claim 7, wherein the available resolution format for said media content includes at least one of high and low.

9. The method of claim 7, wherein said channel of media content also includes: at least information relating to one received service identifier.

10. The method of claim 7, wherein said permitting transfer of said media content from said device to another device based on the channel of said media content comprises:
    permitting transfer of an available resolution format for said media content from said device to another device based on the channel of said media content.

11. An apparatus to transfer a media content comprising:
    a processor;
    a memory containing a set of instructions executed by the processor, the executed set of instructions cause the processor to perform the operations:
    determining a channel of a media content being received by a device from a computer network based on at least one received service identifier that contains information identifying attributes of said media content; and
    permitting transfer of said media content from said device to another device based on the channel of said media content; wherein permitting transfer of a first available resolution format for said media content from said device to another device is based on the channel of said media content; and wherein denying transfer of a second available resolution format for said media content from said device to another device is based on the channel of said media content.

12. The apparatus of claim 11, wherein said permitting transfer of said media content from said device to another device based on the channel of said media content comprises:

permitting transfer of an available resolution format for said media content from said device to another device based on the channel of said media content.

* * * * *